(12) United States Patent
Chen

(10) Patent No.: US 8,509,749 B2
(45) Date of Patent: Aug. 13, 2013

(54) MOBILE COMMUNICATION APPARATUS AND OPERATING METHOD THEREOF

(75) Inventor: Shih Hao Chen, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 122 days.

(21) Appl. No.: 12/788,085

(22) Filed: May 26, 2010

(65) Prior Publication Data

US 2010/0323672 A1 Dec. 23, 2010

(30) Foreign Application Priority Data

Jun. 23, 2009 (TW) .................................. 98121039

(51) Int. Cl.
*G06F 15/16* (2006.01)
(52) U.S. Cl.
USPC ..................................... 455/414.1; 455/414.2

(58) Field of Classification Search
USPC ................ 455/414.1, 414.2, 415, 456.1, 457; 701/200, 202, 208, 210, 211
See application file for complete search history.

(56) References Cited

U.S. PATENT DOCUMENTS

| | | | |
|---|---|---|---|
| 2001/0044803 A1* | 11/2001 | Szutu | 707/104.1 |
| 2001/0053690 A1* | 12/2001 | Inoue | 455/415 |
| 2003/0026401 A1* | 2/2003 | Bates et al. | 379/114.15 |
| 2004/0138810 A1* | 7/2004 | Sugawara | 701/208 |

* cited by examiner

*Primary Examiner* — Sam Bhattacharya
(74) *Attorney, Agent, or Firm* — Han IP Corporation

(57) ABSTRACT

A mobile communication apparatus includes a searching module, a retrieval module, and a display module. The searching module searches for an address corresponding to a phone number inputted into the mobile communication apparatus. The retrieval module retrieves a geographic map corresponding to the address. The display module displays the retrieved geographic map.

15 Claims, 5 Drawing Sheets

MOBILE COMMUNICATION APPARATUS AND OPERATING METHOD THEREOF

CROSS REFERENCE TO RELATED PATENT APPLICATIONS

This patent application claims priority from Taiwan Patent Application No. 098121039, filed in the Taiwan Patent Office on Jun. 23, 2009, entitled "Mobile Communication Apparatus and Operating Method Thereof", and incorporates the Taiwan patent application in its entirety by reference.

TECHNICAL FIELD

The present disclosure relates to wireless communication, and more particularly, to a mobile communication apparatus and an operating method capable of automatically displaying a geographic map corresponding to a phone number inputted by a user.

BACKGROUND OF THE PRESENT DISCLOSURE

As the wireless communication technology continuously develops, various types of mobile communication apparatuses, e.g., smart phones, personal digital assistants (PDAs), and the like, become indispensable tools in the daily life of modern people. In addition, since the satellite positioning technology is becoming mature day by day, many newly launched mobile phones have positioning and navigating functions and map image search function to meet requirements of mobile phone users.

However, for a common user, a current mobile phone with the map image search function is inconvenient and incomplete. Upon the user's dialing a phone number, the mobile phone does not activate the map image search function. When the user wishes to search for map image information associated with a certain phone number, he has to first obtain or inquire a detailed address corresponding to the phone number, and manually enter the address into the mobile phone in a map image search function mode. Such operation not only is rather complicated, but also lacks humanization.

Accordingly, a main object of the present disclosure is to provide a mobile communication apparatus and an operating method thereof to solve the foregoing problem.

SUMMARY OF THE PRESENT DISCLOSURE

According to an embodiment of the present disclosure, a mobile communication apparatus comprises a searching module, a retrieval module and a display module. The retrieval module is coupled to the searching module, and the display module is coupled to the retrieval module. The searching module searches for an address corresponding to a phone number inputted into the mobile communication apparatus. The retrieval module retrieves a geographic map corresponding to the address. The display module then displays the retrieved geographic map.

In practical applications, the searching module may search a plurality of phone numbers stored in the mobile communication apparatus for the address corresponding to the phone number, or search via the Internet for the address corresponding to the phone number. The retrieval module may retrieve the geographic map corresponding to the address from geographic data stored in the mobile communication apparatus, or search via the Internet for the geographic map corresponding to the address.

According to another embodiment of the present disclosure, a method for operating a mobile communication apparatus comprises detecting a phone number inputted into the mobile communication apparatus; searching for an address corresponding to the inputted phone number; retrieving a geographic map corresponding to the address; and displaying the retrieved geographic map.

In conclusion, according to a mobile communication apparatus and an operating method thereof provided by the present disclosure, when a user dials a phone number, an address and a geographic map corresponding to the inputted phone number are automatically searched for from a database of the mobile communication apparatus or via the Internet, and are automatically displayed on a screen of the mobile communication apparatus. Accordingly, different from the prior art, the user need not enter the address into the mobile phone apparatus to search for and display a corresponding geographic map, the needed geographic map can still be easily obtained via the mobile communication apparatus. Therefore, time and efforts for searching for the geographic map by operating the mobile communication apparatus by the user are effectively saved to provide a more humanized operating experience.

Following description and figures are disclosed to gain a better understanding of the advantages of the present disclosure.

DETAILED DESCRIPTION OF THE PREFERRED EMBODIMENT

According an embodiment of the present disclosure, a mobile communication apparatus is capable of automatically displaying a map corresponding to a phone number inputted by a user. For example, the mobile communication apparatus may be a mobile phone, a PDA or other communication apparatuses having a wireless communication function.

Figure 1:
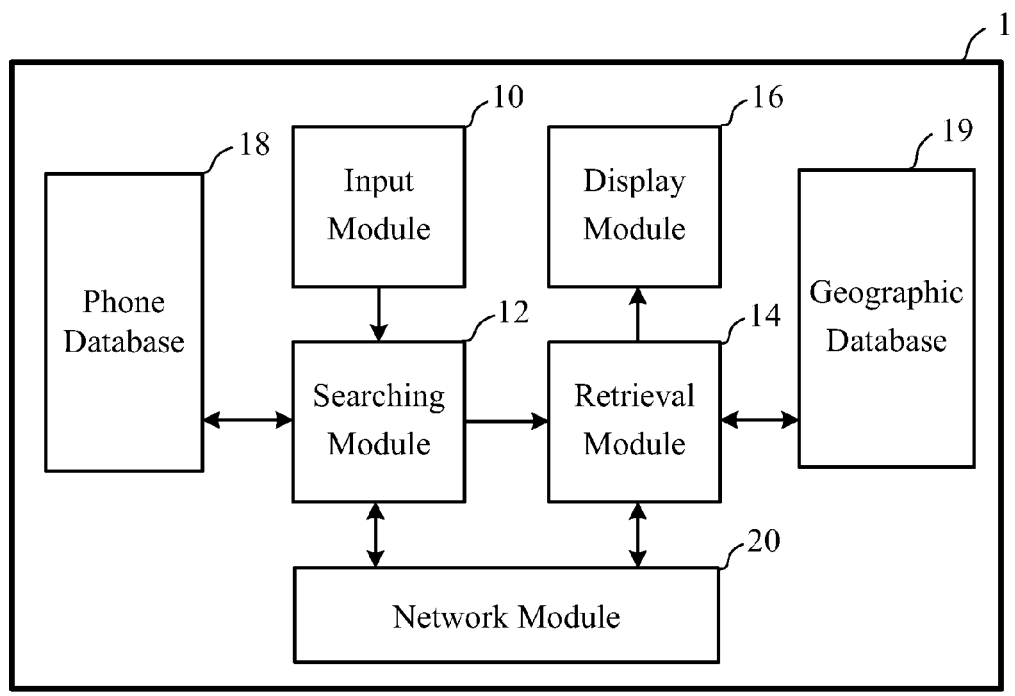
FIG. 1 is a block diagram of a mobile communication apparatus in accordance with an embodiment of the present disclosure.

FIG. 1 shows a block diagram of a mobile communication apparatus in accordance with an embodiment of the present disclosure. A mobile communication apparatus 1 comprises an input module 10, a searching module 12, a retrieval module 14, a display module 16, a phone database 18, a geographic database 19, and a network module 20. The input module 10 is coupled to the searching module 12; the searching module 12 is coupled to the retrieval module 14, the phone database 18 and the network module 20; and the retrieval module 14 is coupled to the display module 16, the geographic database 19 and the network module 20. Details of the modules of the mobile communication apparatus 1 are described below.

In this embodiment, the input module 10 is for entering a phone number by a user into the mobile communication apparatus 1. For example, the input module 10 may be a keyboard, a button group, a writing pad, a voice input device or other devices having a digital input function. More specifically, supposing that the input module 10 is a writing pad and the user wishes to enter the phone number "035526006", the user can write the digits "3", "5", "5", "2", "6", "0", "0" and "6" on the writing pad via a manuscript pen to input the complete phone number. In addition, instead of applying a hardware approach through the mobile communication apparatus 1, the user can also input the complete phone number through an input interface on the screen via a touch control approach. Alternatively, the input of the phone number may be realized by selecting a contact person from a phone book or an address book, or be realized by accessing a radio frequency identification (RFID) tag or scanning a bar code via an RFID reader or a bar code scanner inside the mobile communication apparatus.

When the user finishes inputting the phone number via the input module 10, the searching module 12 of the mobile communication apparatus 1 searches for an address corresponding to the phone number. For example, in addition to a complete phone number, the phone number may also be a partial phone number, a country code, an area code, a city code or other random digit serials.

In this embodiment, various types of approaches are used for searching for the address corresponding to the phone number by the searching module 12 of the mobile communication apparatus 1. For example, the searching module 12 searches the phone database 18, which is stored with a plurality of phone numbers and a plurality of addresses corresponding to the plurality of phone numbers, and thus the searching module 12 can determine the phone number from the plurality of phone numbers stored in the phone database 18, so that the address corresponding to the phone number is smoothly obtained from the phone database 18.

In addition, the searching module 12 may connect to the Internet via the network module 20 to search for and determine the address corresponding to the phone number. For example, the searching module 12 first searches the Internet via the network module 20, and then determines candidate addresses corresponding to the phone number from web pages according to contexts adjacent to a position of the phone number, e.g., when three lines of characters prior and subsequent to the phone number in a web page specify any address including city, town, village, road, alley or street number, the address is regarded as a candidate address. After that, a candidate address that appears most frequently together with the phone number is selected from the plurality of candidate addresses to serve as the address corresponding to the phone number.

For example, the searching module 12 can simultaneously or in sequence implement both approaches of searching the database and via the network, or implement one from the two approaches to search for the address. Other search approaches can be applied, and the foregoing approaches shall not be construed as limiting the present disclosure. In addition, the searching module 12 is but not limited to being connected to the Internet via the network module 20.

When the searching module 12 obtains the address corresponding to the phone number, the retrieval module 14 can further retrieve a geographic map corresponding to the address.

In this embodiment, various types of approaches are used for retrieving the geographic map corresponding to the address by the retrieval module 14 of the mobile communication apparatus 1. For example, the retrieval module 14 can retrieve from the geographic database 19, which is stored with a plurality of geographic data, and thus the geographic map is retrieved from the plurality of geographic data stored in the geographic database 19 according to the address.

For example, the retrieval module 14 determines a position coordinate corresponding to the address according to the address, selects a corresponding geographic map from the plurality of geographic data according to the position coordinate, and retrieves the desired geographic map from the plurality of geographic data.

For example, supposing that the geographic map is a map image of a national map, when the address corresponds to a coordinate A on the map image, for viewing convenience of the user, the retrieval module 14 retrieves a partial map image centering on the coordinate A on the map image. Parameters, e.g., a size of the map image, an area covered by the map image and a scale of the mage image, can be system values or user-defined values.

In addition, the retrieval module 14 may obtain the geographic map corresponding to the address from a geographic database through the Internet via the network module 20. For example, the retrieval module 14 can simultaneously or in sequence implement both of the database search approach and the network search approach, or apply one from the two approaches to search for the geographic map. Other search approaches can be applied, and are also encompassed within the scope of the present disclosure.

It is to be noted that, the criteria of details of the geographic map may be associated with, for example, a type (e.g., a phone number, a country code, an area code or a city code) of the phone number inputted into the mobile communication apparatus 1. In this embodiment, the criteria of details of the geographic map comprise, e.g., a size, a cover area and a scale of the map image contained in the geographic map. A practical example is described below for illustration purposes.

Figure 2A:
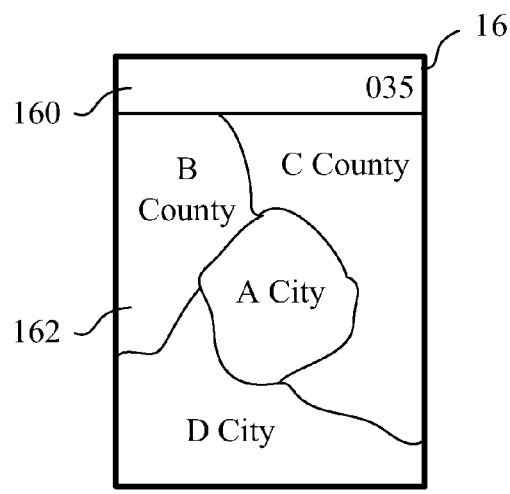
FIG. 2A to FIG. 2C respectively show images of a geographic map when a mobile communication apparatus is under different operating statuses.

Suppose that the user wishes to inquire an image map of an address corresponding to a phone number "035525921" via the mobile communication apparatus 1. Referring to FIG. 2A, when the user enters digits "0", "3" and "5" in sequence, supposing that the searching module 12 of the mobile communication apparatus determines that "035" is an area code corresponding to "City A", the retrieval module 14 of the mobile communication apparatus 1 retrieves and displays a map image corresponding to "City A" on an image display area 162 of the display module 16. Further, the digits "035" entered by the user are displayed at a phone number display area 160 of the display module 16.

When the user continues to enter digits "5", "2", "5", "9", "2" and "1" after "035", supposing that the searching module 12 determines that an address of the phone number "035525921" is "No. 102, K street, A City", the retrieval module 14 retrieves and displays a vicinity map image centering on a position coordinate corresponding to the address "No. 102, K Street, A City" at the image display area 162 of the display module 16. Further, the digits "035525921" entered by the user are displayed at the phone number display area 160 of the display module 16 as shown in FIG. 2B.

For example, based on user requirements, the user may set the mobile communication apparatus 1 such that the searching module 12 performs searching every time the user enters a digit of a phone number into the mobile communication apparatus 1, or the searching module 12 only performs searching when the user enters the complete phone number into the mobile communication apparatus 1 and confirms by pressing an "enter" key.

In practical applications, an image displayed by the display module 16 of the mobile communication apparatus 1 may comprise the geographic map and a function interface of the mobile communication apparatus 1. Referring to FIG. 2C, the display module 16 displays the geographic map in a background of the image display area 162, and displays the function interface in a foreground of the image display area 162. Only the geographic map is displayed at the image display area 162 in FIG. 2B while the function interface is not displayed. For example, the function interface may be an input interface comprising a plurality of dialing keys to provide a touch function for entering phone number.

Figure 2B:
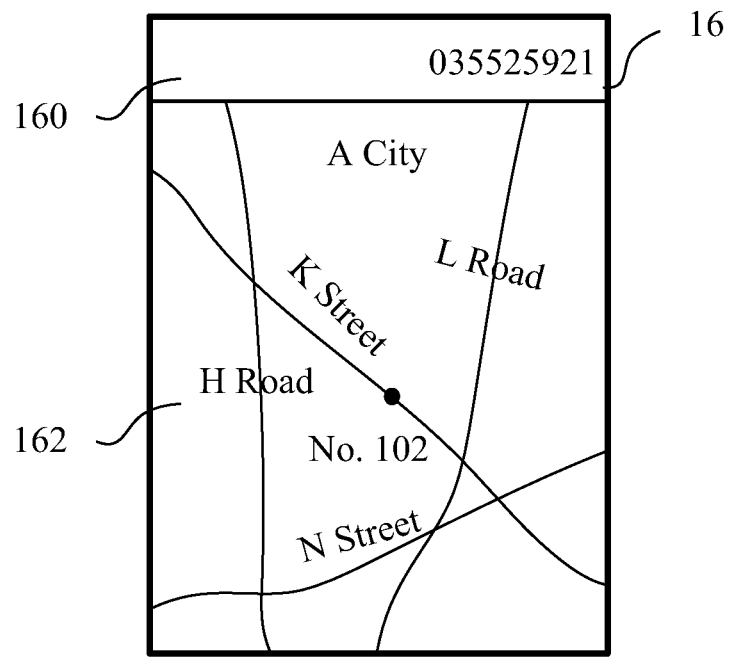
Figure 2C:
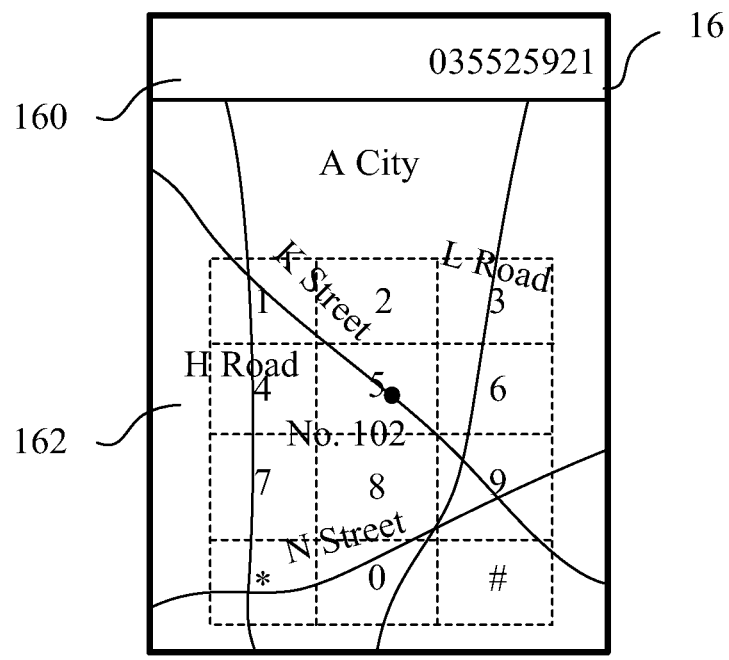

Referring to FIG. 2A to 2B, suppose that Mr. Wang wishes to drive to Miss Li's house, knowing that Miss Li's residential phone number is "035525921". In addition, Mr. Wang is unfamiliar with a location of Miss Li's house for he is visiting for the first time. Therefore, Mr. Wang enters Miss Li's residential phone number into the mobile communication apparatus 1. When the digits "0", "3", "5" are entered, the display module 16 displays a map image corresponding to "A City" on the image display area 162. When Mr. Wang enters the complete phone number "035525921", a map image corresponding to Miss Li's residential address (i.e., No. 102, K Street, A City) is displayed on the image display area 162 of the display module 16. Accordingly, Mr. Wang can obtain the accurate position of Miss. Li's house without getting lost.

It is to be noted that, a structure of a mobile communication apparatus provided by the present disclosure need not be the same as that in FIG. 1 and may be properly adjusted based on practical situations. For example, supposing that the mobile communication apparatus applies a database but not the Internet to search for an address and retrieves a geographic map, a network module may not be necessarily but a phone database and a geographic database remain essential parts in the mobile communication apparatus.

In contrast, when the mobile communication apparatus searches for the address and retrieve the geographic map via the Internet but not from the database, the phone database and the geographic database need not be built in the mobile communication apparatus while the network module becomes an essential part. Other situations associated with the mobile communication apparatus can be generated by analogy, and details thereof shall not be described for brevity.

Figure 3:
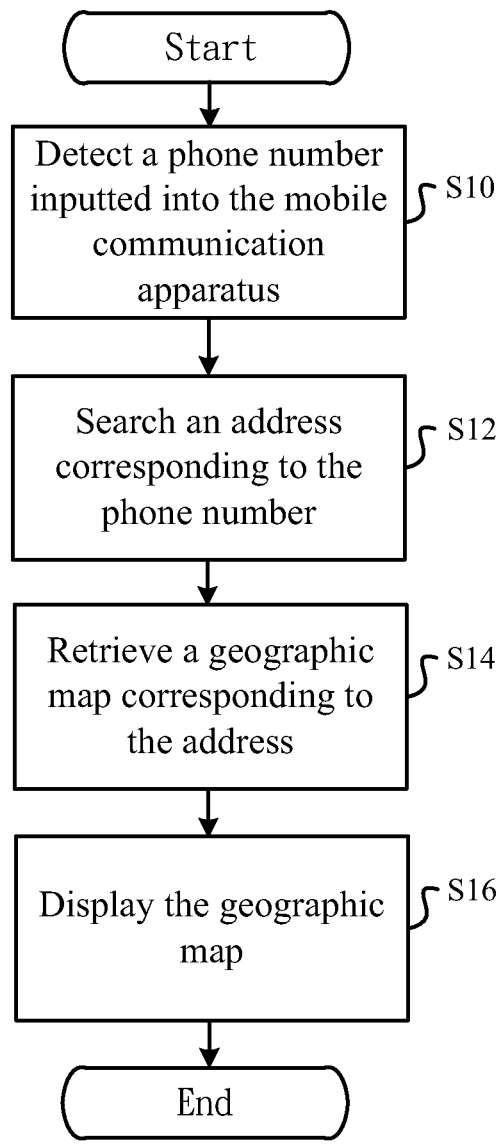
FIG. 3 is a flow chart of a method for operating a mobile communication apparatus in accordance with another embodiment of the present disclosure.

According to another embodiment, a method for operating a mobile communication apparatus is provided. FIG. 3 shows a flow chart of a method for an operating mobile communication apparatus. The method begins with Step S10 in which a phone number inputted into the mobile communication apparatus is detected. In practice, a method for entering the phone number into the mobile communication apparatus is not limited to the user inputting the phone number via a keyboard, a keypad, a writing pad or a voice input device of the mobile communication apparatus, or a touch control approach that the user inputs the phone number via an input interface displayed on a screen of the mobile communication apparatus, provided that the mobile communication apparatus can receive the phone number.

In Step S12, an address corresponding to the phone number is searched for. In practical applications, in addition to a complete phone number, the phone number may also be but not limited to a partial phone number, a country code, an area code, a city code or other random digit serials. Various types of approaches may be used for searching for the address corresponding to the phone number, e.g., the mobile communication apparatus searches via a phone database or the Internet.

In Step S14, a geographic map corresponding to the address is retrieved. For example, the geographic map may be a map image. Various types of approaches may be used for retrieving the geographic map corresponding to the address, e.g., the mobile communication apparatus retrieves from a plurality of geographic data stored in a geographic database.

In Step S16, the geographic map is displayed. For example, the geographic map is displayed in a background of an image or at a function interface in a foreground of the image of a screen of the mobile communication apparatus.

For example, the criteria of details on the geographic map is associated with a type of the phone number entered into the mobile communication apparatus, including a phone number, a country code, an area code or a city code. In this embodiment, the criteria of details on the geographic map comprise a size, a covered area and a scale of the map image contained in the geographic map.

Figure 4:
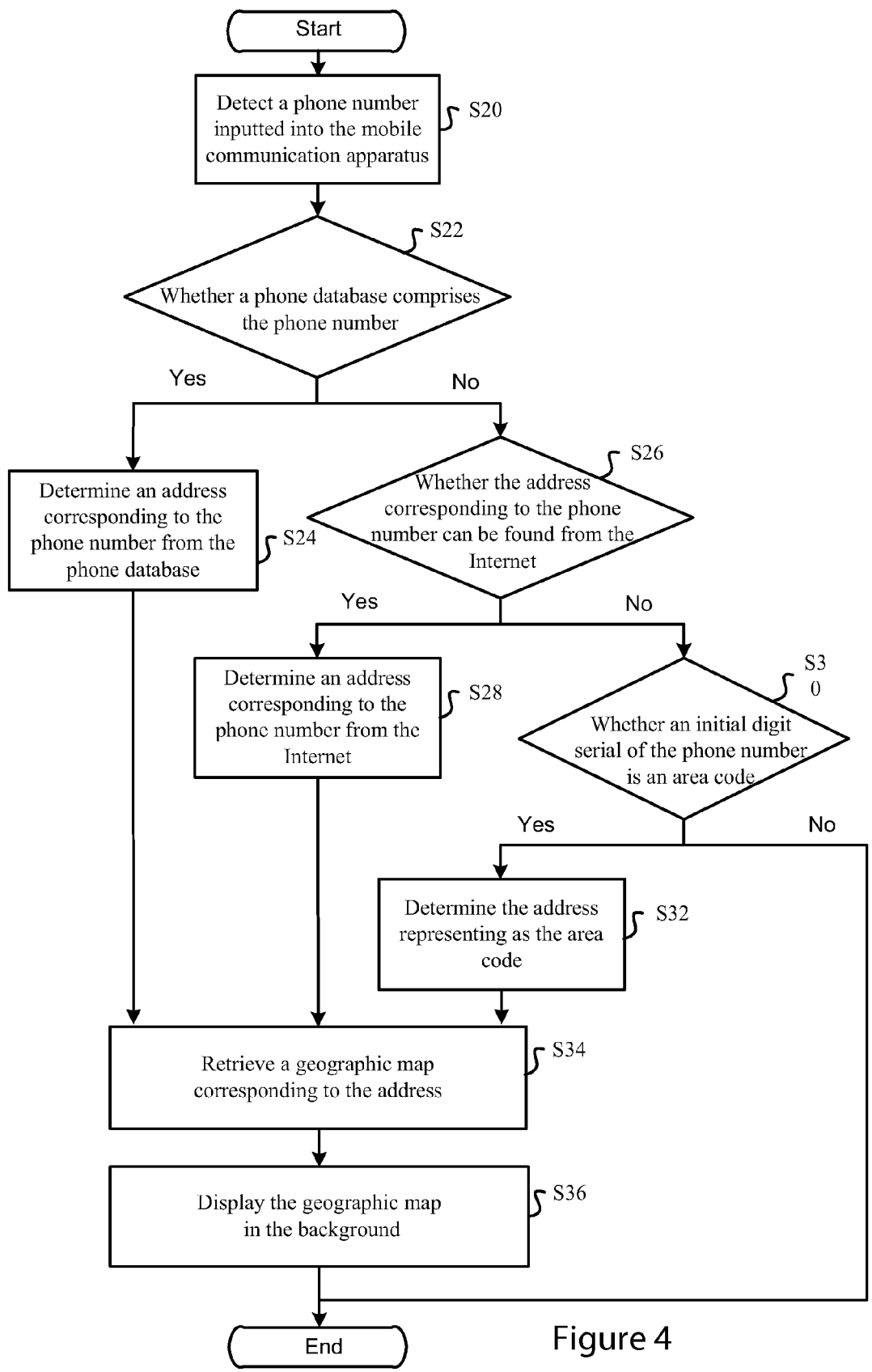
FIG. 4 and FIG. 5 respectively show different examples of the method for operating the mobile communication apparatus shown in FIG. 3.

Detailed steps of a method for operating a mobile communication apparatus are described below via a practical example. FIG. 4 shows a flow chart of the example of the method for operating the mobile communication apparatus. The method begins with Step S20 in which a phone number inputted into the mobile communication apparatus is detected. In Step S22, it is determined whether a phone database of the mobile communication apparatus comprises the phone number.

When a result of Step S22 is positive, it means that the phone number is in the phone database, and the method performs Step S24 in which an address corresponding to the phone number is determined from the phone database. When the result of Step S22 is negative, it means that the phone number is not in the phone database, and the method performs Step S26 in which it is determined whether the address corresponding to the phone number can be found from the Internet.

In other examples, the Internet is first searched, and when no address corresponding to the phone number is found from the Internet, the phone database is then searched; alternatively, only the Internet or the database is searched. Proper modifications can be made on the approach and sequence for the searching without departing from the spirit and scope of the present disclosure.

When a result of Step S26 is positive, the method performs Step S28 in which the address corresponding to the phone number is determined via the Internet. When the result of Step S26 is negative, it means that no address corresponding to the phone number is found from neither the phone database nor the Internet, i.e., the mobile communication apparatus cannot display a detailed map image corresponding to the phone number, and thus the method performs Step S30 in which it is determined whether an initial digit serial of the phone number is an area code.

When a result of Step S30 is positive, it means that the initial digit serial of the phone number is an area code, and the method performs Step S32 in which the represented address corresponding to the area code is obtained from the Internet or the database.

As can be seen from the foregoing steps, the address can be obtained in Step S24, Step S28 and Step S32, and accordingly the method performs a subsequent Step S34 in which a geographic map corresponding to the address is retrieved. After that, in Step S36, an image having the geographic map as a background is displayed. It is to be noted that, when the result of Step S30 is negative, it means that the phone number inputted by the user does not even comprise an area code, such that the mobile communication apparatus cannot obtain or display the geographic map.

Figure 5:
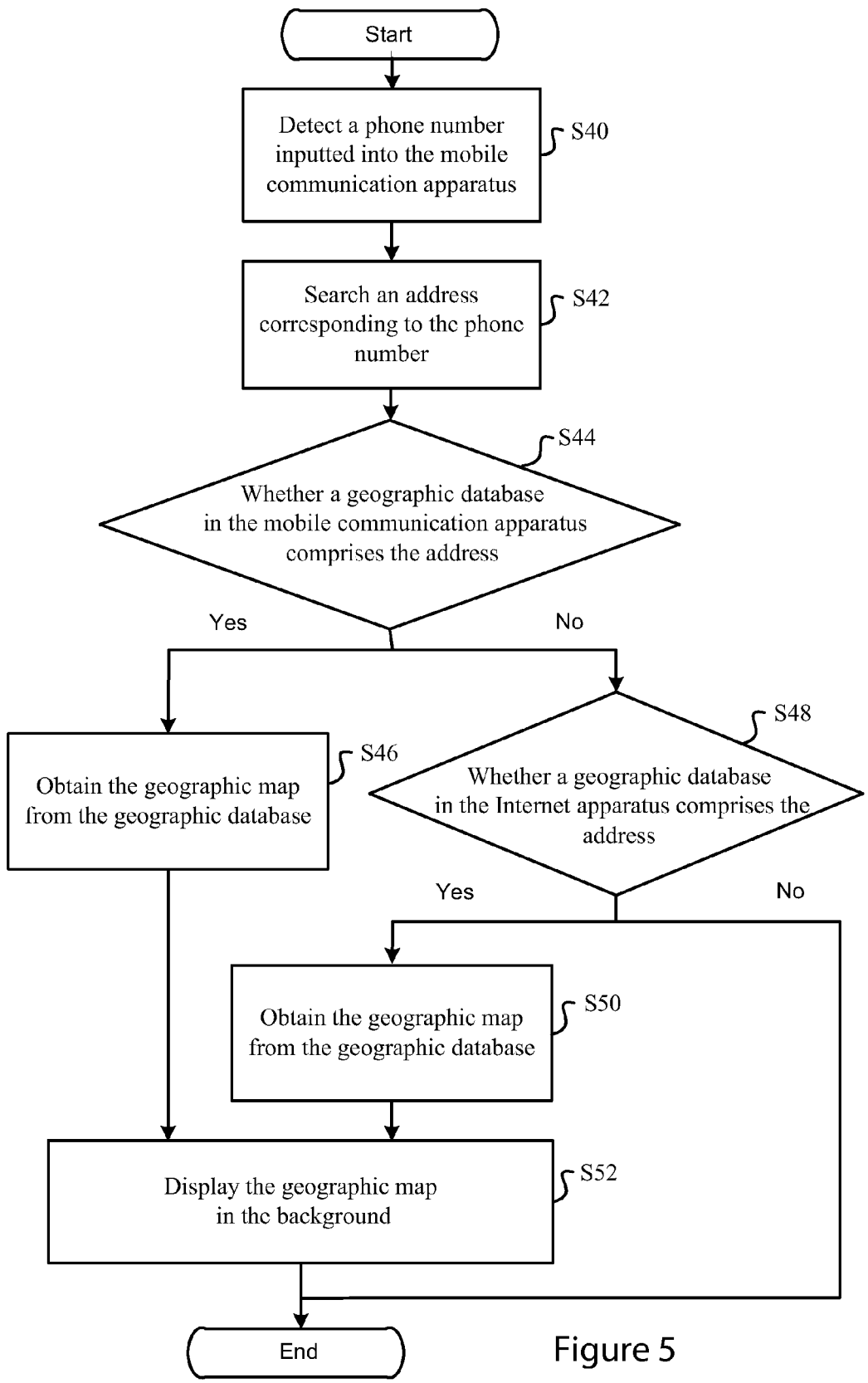

FIG. 5 shows a flow chart of another example of a method for operating a mobile communication apparatus. The method begins with Step S40 in which phone number inputted into the mobile communication apparatus is detected. In Step S42, an address corresponding to the phone number is searched for.

Upon determining the address, the method performs Step S44 in which it is determined whether a geographic database of the mobile communication apparatus comprises a geographic map corresponding to the address. When a result of Step S44 is positive, the method performs Step S46 in which the geographic map is obtained from the geographic database. When the result of Step S44 is negative, the method performs Step S48 in which it is determined whether the geographic database comprises the geographic map. When a result of Step S48 is positive, the method performs Step S50 in which the geographic map is obtained from the geographic database.

As described in the foregoing steps, the geographic map can be obtained in Step S46 and Step S50, and accordingly the method performs a subsequent Step S52 in which an image having the geographic map as a background is displayed. It is to be noted that, when the result of Step S48 is negative, it means that the geographic map corresponding to the address cannot be found in the geographic database from either the mobile communication apparatus or the Internet, such that the mobile communication apparatus cannot obtain or display the geographic map.

In conclusion, according to a mobile communication apparatus and an operating method thereof provided by the present disclosure, when a user dials a phone number, an address and a geographic map corresponding to phone number inputted by the user are automatically searched from a database of the mobile communication apparatus or via the Internet and then automatically displayed on a screen of the mobile communication apparatus. Accordingly, the user need not enter the address into the mobile phone apparatus to search for and display corresponding geographic map as required in the prior art, and the needed geographic map can still be easily obtained via the mobile communication apparatus. Therefore, time and efforts for searching for the geographic map by operating the mobile communication apparatus by the user are effectively saved to provide a more humanized operating experience.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A mobile communication apparatus, comprising:
   a searching module that searches web pages on the Internet for an address corresponding to an inputted partial phone number;
   a retrieval module, coupled to the searching module, that retrieves a geographic map according to the address; and
   a display module, coupled to the retrieval module, that displays the geographic map,
   wherein a scale of the geographic map displayed by the display module is determined at least partially based on the inputted partial phone number.

2. The mobile communication apparatus as claimed in claim 1, wherein the display module displays the geographic map in a background and a function interface in a foreground.

3. The mobile communication apparatus as claimed in claim 2, wherein the function interface is an input interface for inputting the phone number.

4. The mobile communication apparatus as claimed in claim 1, further comprising a geographic database that stores geographic data, wherein the retrieval module retrieves the geographic map from the geographic data according to the address.

5. The mobile communication apparatus as claimed in claim 1, wherein the searching module searches a plurality of candidate addresses corresponding to the phone number from contexts of one or more of the web pages comprising the phone number, and wherein the searching module further selects one of the candidate address that appears most frequently together with the phone number as the address.

6. The mobile communication apparatus as claimed in claim 1, wherein the retrieval module obtains the geographic map corresponding to the address from another geographic database on the Internet.

7. The mobile communication apparatus as claimed in claim 1, wherein the phone number comprises at least two digital numbers.

8. The mobile communication apparatus as claimed in claim 1, wherein an area covered by the geographic map is determined by the inputted phone number.

9. The mobile communication apparatus as claimed in claim 1, wherein the phone number is one of a complete phone number, a country code, a city code, or an area code.

10. A method for operating a mobile communication apparatus, comprising:
    receiving a partial phone number;
    searching web pages on the Internet for an address corresponding to the partial phone number;
    retrieving a geographic map according to the address; and
    displaying the geographic map such that a scale of the displayed geographic map is at least partially based on the partial phone number.

11. The method as claimed in claim 10, further comprising displaying a function interface, wherein the geographic map is displayed in a background and a function interface is displayed in a foreground.

12. The method as claimed in claim 11, wherein the function interface is an input interface for receiving the phone number.

13. The method as claimed in claim 10, wherein the mobile communication apparatus has a geographic database storing geographic data, and the geographic map is retrieved from the geographic data according to the address.

14. The method as claimed in claim 10, wherein the step of searching for the address comprises:
    searching the phone number from contents of the web pages;
    determining, from contexts of the contents of one or more of the web pages comprising the phone number, a plurality of candidate addresses corresponding to the phone number; and
    selecting, from the plurality of candidate addresses, a candidate address that appears most frequently together with the phone number as the address corresponding to the phone number.

15. The method as claimed in claim 10, wherein the geographic map corresponding to the address is obtained from another geographic database on the Internet.

* * * * *